US008239307B2

(12) United States Patent
Boscaljon

(10) Patent No.: US 8,239,307 B2
(45) Date of Patent: Aug. 7, 2012

(54) ASSET ALLOCATION BASED ON EXPECTED UTILITY OF TIME AND WEALTH

(75) Inventor: Brian Boscaljon, Erie, PA (US)

(73) Assignee: The Penn State Research Foundation, University Park, PA (US)

( * ) Notice: Subject to any disclaimer, the term of this patent is extended or adjusted under 35 U.S.C. 154(b) by 440 days.

(21) Appl. No.: 12/496,198

(22) Filed: Jul. 1, 2009

(65) Prior Publication Data
US 2010/0017342 A1    Jan. 21, 2010

Related U.S. Application Data

(60) Provisional application No. 61/077,410, filed on Jul. 1, 2008.

(51) Int. Cl.
*G06Q 40/00* (2012.01)
(52) U.S. Cl. ............................ 705/36 R; 705/35; 705/37
(58) Field of Classification Search ............... 705/35–37
See application file for complete search history.

(56) References Cited

U.S. PATENT DOCUMENTS

| | | | | |
|---|---|---|---|---|
| 5,918,217 A * | 6/1999 | Maggioncalda et al. | ... | 705/36 R |
| 6,012,044 A * | 1/2000 | Maggioncalda et al. | ... | 705/36 R |
| 6,021,397 A * | 2/2000 | Jones et al. | ...... | 705/36 R |
| 7,016,870 B1 * | 3/2006 | Jones et al. | ........ | 705/35 |
| 7,062,458 B2 * | 6/2006 | Maggioncalda et al. | ... | 705/36 R |
| 7,120,601 B2 * | 10/2006 | Chen et al. | ......... | 705/36 R |
| 7,788,155 B2 * | 8/2010 | Jones et al. | ........ | 705/36 R |
| 7,983,975 B2 * | 7/2011 | Jones et al. | ........ | 705/36 R |
| 2002/0138386 A1 * | 9/2002 | Maggioncalda et al. | ....... | 705/36 |
| 2003/0126054 A1 * | 7/2003 | Purcell, Jr. | ...... | 705/36 |
| 2003/0233301 A1 * | 12/2003 | Chen et al. | ...... | 705/36 |
| 2004/0054610 A1 * | 3/2004 | Amstutz et al. | ....... | 705/36 |
| 2006/0010060 A1 * | 1/2006 | Jones et al. | ....... | 705/35 |
| 2007/0011069 A1 * | 1/2007 | Bevacqua, Jr. | ............ | 705/35 |
| 2007/0208536 A1 * | 9/2007 | Spector et al. | ........ | 702/182 |
| 2008/0010181 A1 * | 1/2008 | Infanger | ............. | 705/36 R |
| 2008/0114703 A1 * | 5/2008 | Dahlberg et al. | ........ | 705/36 R |
| 2008/0147567 A1 * | 6/2008 | Perry et al. | ........... | 705/36 R |
| 2008/0154792 A1 * | 6/2008 | Maggioncalda et al. | ... | 705/36 R |
| 2008/0189224 A1 * | 8/2008 | Coopersmith | ........... | 705/36 T |

(Continued)

OTHER PUBLICATIONS

Booth, Laurence "Formulating retirement targets and impact of time horizon on asset allocation" Financial Services Review, 13 (2004) pp. 1-17.*

Gupta et al. "A Framework Algorithm to Compute Optimal Asset Allocation for Retirement with Behavioral Utilities" (2004) Stanford University, pp. 1-44.*

Boscaljon, Brian, "Time, Wealth, and Human Capital as Determinants of Asset Allocation," Financial Services Review, vol. 13, No. 3, pp. 167-184, 2004.

(Continued)

*Primary Examiner* — Narayanswamy Subramanian
(74) *Attorney, Agent, or Firm* — Novak Druce + Quigg LLP

(57) ABSTRACT

A method and system for providing financial advice to individuals that includes outputting a target asset allocation for an individual and a critical wealth, a retirement wealth, a utility function, or a combination thereof. The target asset allocation includes a target securities allocation and is computed using a function analyzing a trade-off between retirement time and retirement consumption of the individual. The method includes computing a critical wealth of the individual, a retirement wealth of the individual, and a wealth utility function of the individual. A determination of whether the individual is in a wealth maximizing phase or a critical wealth phase is made. The determination is based on whether the individual has a current wealth equal to or greater than the calculated critical wealth threshold. Having determined the relevant wealth phase, a target asset allocation for the current assets of the individual is computed.

19 Claims, 5 Drawing Sheets

U.S. PATENT DOCUMENTS

| | | | |
|---|---|---|---|
| 2008/0235154 A1* | 9/2008 | Jones et al. | 705/36 R |
| 2009/0018969 A1* | 1/2009 | Ayres et al. | 705/36 R |
| 2009/0048958 A1* | 2/2009 | Gardner et al. | 705/35 |
| 2009/0319438 A1* | 12/2009 | Jain | 705/36 R |
| 2011/0055115 A1* | 3/2011 | Hu et al. | 705/36 T |
| 2011/0191260 A1* | 8/2011 | Kolbusz | 705/36 R |
| 2011/0282806 A1* | 11/2011 | Wilcox | 705/36 T |
| 2012/0005056 A1* | 1/2012 | Newman et al. | 705/35 |
| 2012/0005121 A1* | 1/2012 | Newman et al. | 705/36 R |
| 2012/0005124 A1* | 1/2012 | Hu et al. | 705/36 T |

OTHER PUBLICATIONS

Bodie, et al., "Labor Supply Flexibility and Portfolio Choice in a Life Cycle Model," Journal of Economic Dynamics and Control, vol. 16, pp. 427-449, 1992.

Sundaresan, et al., "Valuation, Optimal Asset Allocation and Retirement Incentives of Pension Plans," The Review of Financial Studies, vol. 10, No. 3, pp. 631-660, 1997.

Michaud, Ph.D., Richard O., Memo to U.S. Department of Labor Re: File No. 4-582, Target Date Fund Joint Hearing, Jun. 5, 2009.

* cited by examiner

US 8,239,307 B2

ASSET ALLOCATION BASED ON EXPECTED UTILITY OF TIME AND WEALTH

CROSS-REFERENCE TO RELATED APPLICATIONS

This application claims priority to U.S. Provisional Application Ser. No. 61/077,410, entitled "Asset Allocation Based on Expected Utility of Time and Wealth," filed Jul. 1, 2008, the entirety of which is incorporated herein by reference.

FIELD OF THE INVENTION

The present invention is related to the fields of asset allocation and wealth management, and more particularly, to techniques for allocating financial assets based upon an expected utility of sustainable consumption and leisure time.

BACKGROUND OF THE INVENTION

Conventional techniques of asset allocation, such as those utilized by many institutional investors, define appropriate asset allocation targets based on the assumptions similar to those proposed by Markowitz (1959), Sharpe (1985), and other scholars of finance and economics. (See Markowitz, Harry M., 1959, *Portfolio Selection: Efficient Diversification of Investments*, New York: Wiley; and Sharpe, William F, 1985, *AAT: Asset Allocation Tools*. Redwood City, Calif.: Scientific Press.) Modern portfolio theory proposes that investors seek efficient portfolios with respect to the mean and variance of the probability distribution of portfolio returns for a specific time period. An important underlying assumption of most economic and finance models is that individuals desire to maximize wealth. In practice quadratic programming algorithms identify optimal portfolios by maximizing return for a given level of risk or minimizing risk for a given level of return.

While these assumptions may be reasonable for most institutions and some individuals, the behavior of most individuals approaching retirement reflect preferences with respect to time as well as wealth and risk. In general, individuals have finite lives and value leisure time, the latter reflected by a willingness to accept reduced consumption by foregoing compensation earned from labor so as to enjoy more leisure time. Conventional models of asset allocation and financial planning typically do not adequately address wealth-consumption-and-time tradeoffs. Accordingly, there is a need for asset allocation and financial planning techniques that take into account an individual's preference for time as well as wealth.

SUMMARY OF THE INVENTION

In view of the foregoing background, it is therefore a feature of the present invention to provide techniques and tools for allocating assets and for providing financial planning to take into account time as well as wealth objectives on an individual.

This and other features and advantages in accordance with the present invention can be provided by a financial planning tool that is based on a mathematical model denoted the Target Wealth Management Model. The model can be utilized to compute, based upon data specific to a particular individual's unique preferences of leisure time, i.e., retirement duration, and sustainable consumption, a critical wealth level. The mathematical properties of the critical wealth level are such that it can be used to determine a level of wealth at which a particular individual is indifferent to a tradeoff between leisure time and sustainable consumption of wealth. In this respect, the critical wealth level is based on the novel notion of a time utility of wealth function, TU(W), which extends the conventional notion of a utility function by taking into account the practical reality that the individual has a finite life.

An important aspect of the critical wealth level is that for wealth values less than the critical wealth level, individuals strictly maximize wealth consistent with conventional utility functions; for wealth values greater than the critical wealth level, individuals balance leisure time and wealth or sustainable consumption, and allocate assets accordingly. The model assumes that for values less than the critical wealth level, the individual values changes in wealth or sustainable consumption more than changes in leisure time, while for values greater than the critical level, the individual values changes in leisure time more than changes in wealth or sustainable consumption.

Thus, more generally, the critical wealth level provides an individual-specific reference point for determining the individual's point of indifference with respect to tradeoffs pertaining to wealth or sustainable consumption, and leisure time. The utility, or subjective satisfaction, that the individual derives from leisure time can be measured against consumption.

The practical applications of the Target Wealth Management Model are varied. The underlying quantitative methodology can be employed, for example, as a method or process of optimizing portfolio allocations. Based upon the critical wealth level, it can be determined when an individual should begin to rebalance an asset portfolio by reducing allocation to equities. The model is specifically designed to aid the individual in the retirement decision process. As reflected in the claims, below, different embodiments of the invention encompass a system, computer-implemented method, and method of doing business.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

The invention is directed to systems and methods for allocating assets and performing financial planning. As already noted, the techniques implemented in these systems and methods can be on a mathematical model denoted the Target Wealth Management Model (TWMM). Utilizing the TWMM an individual's critical wealth level can be computed, based upon data specific to the particular individual. In turn, the system and methods based on the TWMM, can determine a level of wealth at which the particular individual is indifferent to a tradeoff between leisure time and sustainable consumption of wealth.

Figure 1:
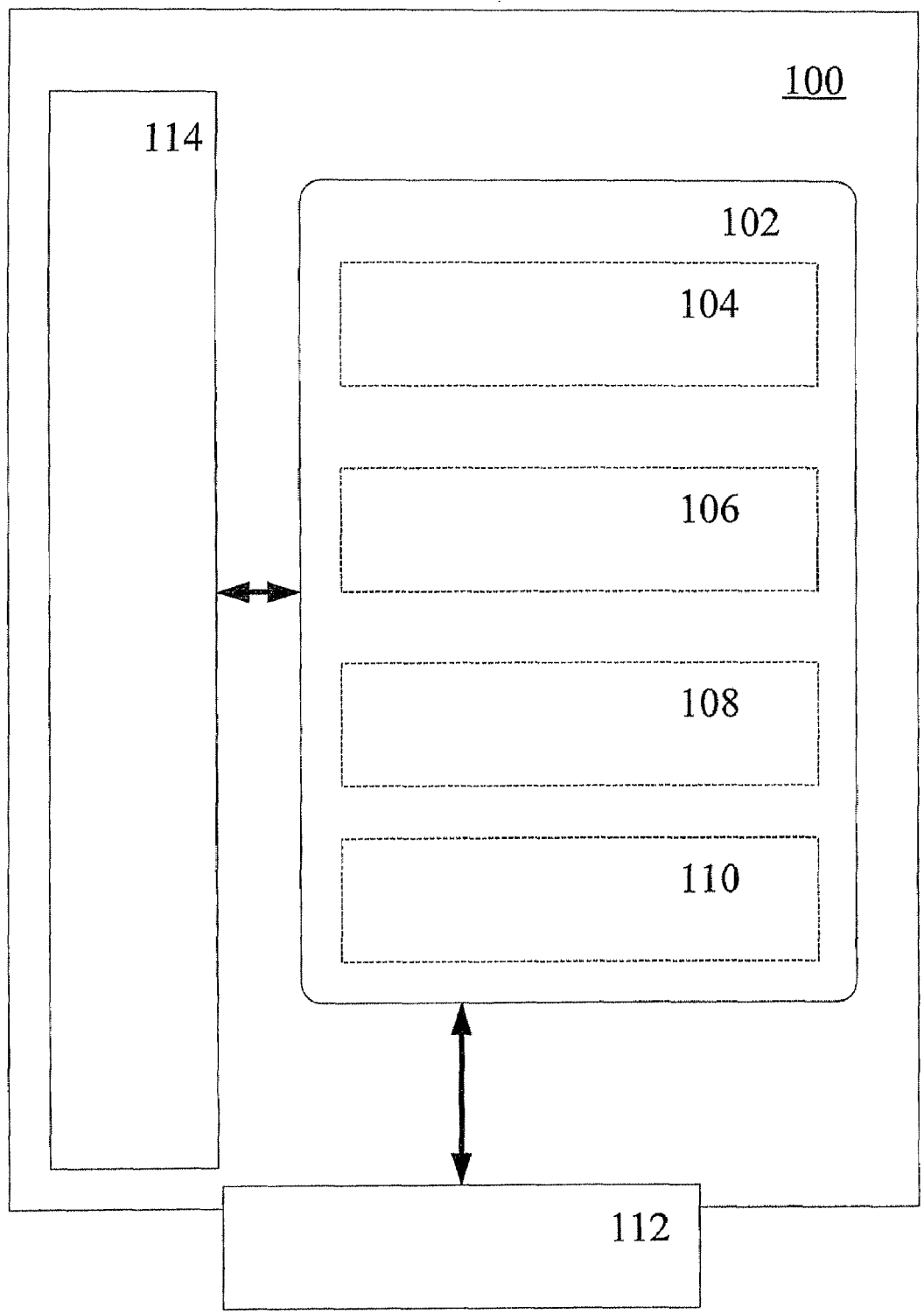
FIG. 1 is a schematic diagram of a system for performing financial planning, according to one embodiment of the invention.

FIG. 1 is a schematic view of a system 100 of financial planning. The system 100 illustratively includes one or more processors 102. Each processor 102 can include logic processing circuitry (not shown), such as registers, arithmetic-logic units (ALUs), and a controller. The system 100 further comprises a module for computing a critical wealth of the individual, a retirement wealth of the individual and a utility of wealth function of the individual 104, a module for determining whether the individual is in a wealth maximizing phase or a critical wealth phase 106, and a module for computing a target asset allocation of said individual 108. The system can also include one or more additional modules 110 for computing a variety of variables and values described herein. Preferably each of the modules is implemented in a combination of logic-based processing circuitry and executable code for performing the processes, procedures, and functions described herein. Accordingly, each of the modules can be configured to execute upon the one more processors 102, which in turn, can be adapted to cause a computer-based system controlled wholly or in part the one or more processors 102 to perform pre-determined processes, procedures, and functions. In alternative embodiments, however, one or more of the modules can be implemented in dedicated circuitry configured to perform the processes, procedures, and functions performed respectively be each.

The system 100 can also include an input device 112 for receiving the data necessary for making the financial planning calculations described herein. In general the input device 112 can be a keyboard, touch screen, mouse, or network communication protocol, for receiving information regarding the variables necessary to calculating individual values for the financial planning of the individual receiving the financial planning advice. The retirement goal can be provided to a user via an output device 114. The output device can be a monitor or other display device and can be connected directly or via a wireless or other remote network.

As already noted, one aspect of the invention is to capture the fact that all individual have finite lives and thus are willing to give up some consumption by reducing the amount of time worked in order to enjoy leisure time. The invention can capture this effect by treating time as a commodity.

All individuals value, but have limited amounts of, time and wealth. Throughout life individuals are forced to make decisions based on their perceived value of leisure time and standard of living or consumption. The annual salary of each individual reflects the amount of labor hours an individual is willing to provide in exchange for wealth. Therefore, time can be viewed as a valuable commodity for which individuals are willing to exchange for wealth. All individuals have a limited amount of total time that is allocated towards labor and leisure time. Individuals allocate more time to labor in order to increase wealth that is used for current and retirement consumption.

Figure 2:
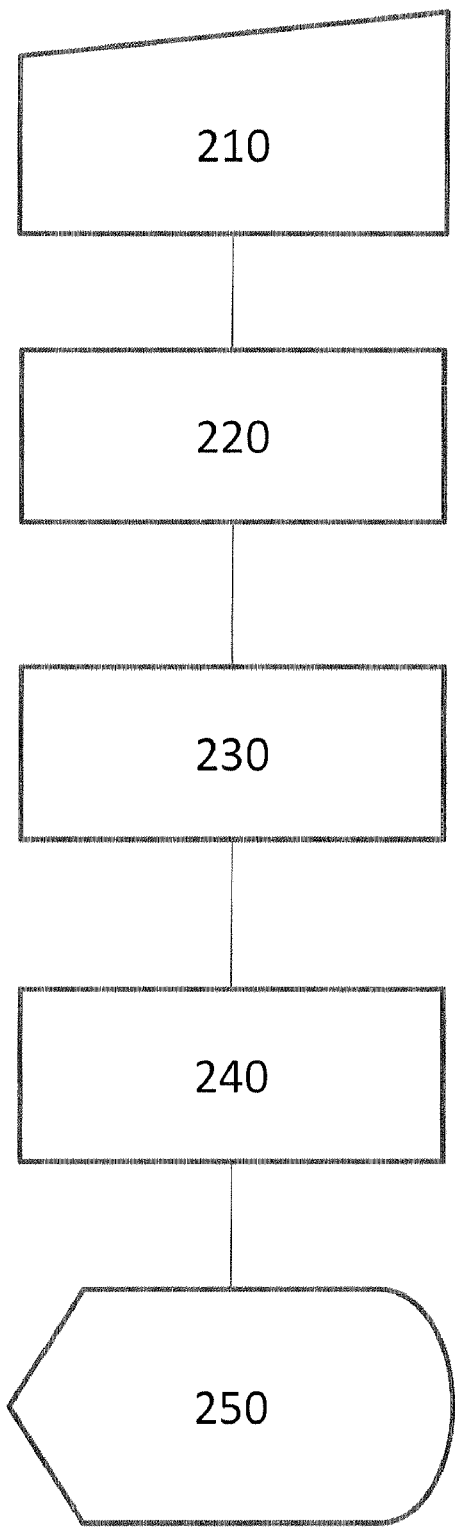
FIG. 2 is a flowchart of exemplary steps in a method of performing financial planning, according another embodiment of the invention.

In one embodiment, the invention is drawn to a method of providing financial advice to an individual. As shown in FIG. 2, the method can include inputting data 210 of an individual in need of financial planning advice. The data can be used to compute a utility function, a critical wealth and a retirement wealth of an individual 220 and determine whether the individual is in a wealth maximizing phase or a critical wealth phase 230. The determining step can include categorizing the individual in a wealth maximizing phase if the individual has a current wealth equal to or greater than the critical wealth, and categorizing the individual in a critical wealth phase if the individual has a current wealth less than the critical wealth. The method can also include computing a target asset allocation 240 for a current wealth of the individual and outputting 250 the target asset allocation for the individual and at least one of the critical wealth, said retirement wealth, and the utility function for review by the individual or a financial planner working with the individual. The target asset allocation can be computed using a utility function analyzing a trade-off between retirement time and retirement consumption of the individual.

The target asset allocation can include a target securities allocation and a target bond allocation. The target asset allocation can further break up the target asset allocation into domestic and foreign components for securities, bonds, or both. The target asset allocation can also include additional classes of investment assets.

The utility function is based on the tradeoff between the individual's value of the length of retirement and the amount of sustainable income available during retirement. The utility function can be:

$$TU(W) = C\left[T - \frac{\ln(rTW + S) - \ln(rW + S)}{\ln(1 + r)}\right]$$

In the utility function, TU(W) can equal the time utility as a function of wealth, C can equal the target annual consumption during retirement, T can equal the individual's remaining life span, i.e., life expectancy less the current age, r can equal estimated total annual return on investments prior to retirement, TW can equal retirement wealth, S can equal annual savings prior to retirement, and W can equal current wealth.

The method can also include electronically monitoring an index of volatility of a stock index, and advising the individual of a modified target securities allocation when the index crosses a pre-determined level. The modified target securities allocation can be 0% if said index exceeds the pre-determined level, and the modified target securities allocation can be the target securities allocation if the index is equal to or less than the pre-determined level for at least a pre-determined period of time.

For example, the index of volatility can be the VIX index and the pre-determined level can be a VIX index of 30. The individual can be advised to remove all money from securities if the VIX index exceeds 30 and can be advised to reinvest in securities after the VIX index has remained at or below 30 for a pre-determined number of days. The pre-determined number of days can be 5 days, 10 days, 15 days, 20 days or 30 days.

In some embodiments the VIX index strategy is only implemented once the individual has attained the critical wealth level. This helps prevent the individual from sustaining large losses, which can be psychologically disturbing when the individual is close to retirement.

The method can also include computing a target asset allocation step can include (i) assigning a wealth maximizing asset allocation as the target asset allocation if the individual is in a wealth maximizing phase, and (ii) assigning to the target asset allocation a securities % as a target percentage of the current wealth invested in securities, if the individual is in a critical wealth phase. The securities % can be calculated using the following formula:

$$\text{Securities \%} = \text{Min \%} + (\text{Max \%} - \text{Min \%})\frac{(TW - W)^2}{(TW - CW)^2}.$$

In the Securities % formula, Min % can be the target percentage of assets in equities during retirement, Max % can be the target percentage of assets in equities during wealth maximizing phase, TW can be the retirement wealth, W can be the current wealth of the individual, and CW can be the critical wealth. The method can also include investing the current wealth according to the target asset allocation.

The method can also include computing the critical wealth comprises (CW) where:

$$CW^* = \frac{\frac{Cr}{\ln(1+r)} - S}{r}.$$

In the critical wealth (CW*) formula C can be the target annual consumption during retirement, r can be the estimated total annual return on investments, and S can be the annual savings of the individual prior to retirement.

Calculating retirement wealth can include computing $TW = C/r_{low}$. In the retirement wealth calculation, C can be the target annual consumption during retirement, and $r_{low}$ can be the estimated total annual return on low risk investments during retirement.

The method can also include computing a duration (t*) of the critical wealth phase and outputting the duration of the critical wealth phase. The critical wealth phase spans a period starting when the current wealth equals or exceeds the critical wealth and ends when the current wealth equals or exceeds the retirement wealth. The duration can be calculated by the following formula:

$$t^* = \frac{\ln(rTW + S) - \ln(rW + S)}{\ln(1 + r)}$$

In the t* formula, r can be the estimated total annual return on investments, TW can be the target retirement wealth, S can be the annual savings prior to retirement, an W can be the current wealth.

The invention can also be drawn to a system for providing financial advice to an individual that includes at least one processor for executing processor-executable instructions for causing the system to compute a target asset allocation for an individual and at least one of a critical wealth of the individual, a retirement wealth of the individual, and a utility function. The system can also include a module on the at least one processor configured to execute instruction for computing at least one of a critical wealth of said individual, a retirement wealth of the individual, and a utility function of wealth of the individual and a module on the at least one processor configured to execute instruction for determining whether the individual is in a wealth maximizing phase or a critical wealth phase. The determining step can include categorizing the individual in a wealth maximizing phase if the individual has a current wealth equal to or greater than the critical wealth, and categorizing the individual in a critical wealth phase if the individual has a current wealth less than the critical wealth. The module on the at least one processor configured to execute instruction for computing a target asset allocation for a current wealth of the individual, and a display device for outputting the target asset allocation for the individual and at least one of the critical wealth, the retirement wealth, and a plot of at least a portion of the utility function. The target asset allocation is computed using a function analyzing a trade-off between retirement time and retirement consumption of the individual.

The system can be configured such that the modules can be adapted for calculating any of the values disclosed herein, including the utility function, the securities %, the critical wealth, the retirement wealth, the duration of the critical wealth phase, or any combination thereof. The system can be configured to receive any input needed in order to make any of the calculations disclosed herein.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The method for providing financial advice to an individual according to the invention is generally implemented on a computer system. The system can include memory (preferably non-volatile memory) which can store all necessary algorithms and methodologies, as well as develop relevant graphics to assist the user. The system can also include memory for storing historical financial data, such as market values. The system can also include output devices, such as a monitor for displaying the target asset allocation, critical wealth, terminal wealth, and related graphics and images.

The computer system can include a processor (such as a central processing unit (CPU)), a graphics processing unit (GPU, or both), a main memory and a static memory, which communicate with each other via a bus. The computer system may further include a video display unit (such as a liquid crystal display (LCD)), a flat panel, a solid state display, or a cathode ray tube (CRT)). The computer system can include an input device (such as a keyboard), a cursor control device (such as a mouse), a disk drive unit, a signal generation device (such as a speaker or remote control) and a network interface device.

The disk drive unit may include a computer-readable medium on which is stored one or more sets of instructions (such as software) embodying any one or more of the methodologies or functions described herein, including those methods illustrated above. The instructions can also reside, completely or at least partially, within the main memory, the static memory, and/or within the processor during execution thereof by the computer system. The main memory and the processor also can constitute computer-readable media.

Dedicated hardware implementations including, but not limited to, application specific integrated circuits, programmable logic arrays and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Discussion

The method and system disclosed herein focus on defining an asset allocation process for the critical time horizon. A primary objective is to explain a rational approach for the reduction of risky assets as an individual approaches retirement. After a critical wealth level is reached, individuals who are cognizant of their diminishing human capital and a growing desire for increased leisure time are no longer primarily concerned with maximizing wealth. Unlike prior approaches, individuals are assumed to optimize the amount of leisure time and sustainable consumption. Their primary goal in the critical time horizon is to obtain a terminal wealth level that will sustain a constant level of consumption during retirement. A critical time horizon and critical wealth level are defined that provide a theoretical foundation for the reduction in the percentage of wealth allocated to equities as an individual approaches retirement.

The critical wealth level determines a shift in risk aversion for individuals. Unlike prior approaches that assume individual's desire to strictly maximize wealth, individuals are assumed to set a terminal wealth or retirement goal based on an optimal mix of both leisure time and consumption. A sustainable level of consumption during retirement is determined based on the level of wealth at the beginning of the retirement period.

In addition to determining the amount to invest in equities based on the relationship of critical wealth to a retirement goal, another factor is considered. As individuals approach retirement they are advised to exit the market when implied volatility based on the VIX index is too high and re-enter the market when the level of implied volatility is acceptable. The Markowitz mean-variance asset allocation model is a one period static model. The optimal asset allocation is a dynamic process for individuals with a multi-period time line problem. The VIX index is used as a "fear indicator" to provide a market sentiment measure of perceived risk for the next 30 days.

An empirical investigation of the TU(W) and traditional approach of reducing equities based on the age of the individual reveals the historical performance of the two approaches from 1990 to 2008. Under the TU(W) approach asset allocations are based on the relationship of critical wealth to the terminal wealth goal and the VIX index. When the VIX index is at 30 or above individuals are advised to reduce allocations to equity to 0%. Individuals are advised to re-enter the market when the VIX has maintained a level of 30 for twenty consecutive days. The findings suggest individuals are more likely to obtain their retirement goals that reflect a desired age as well as wealth that will sustain consumption in retirement with the TU(W) approach rather than the traditional ad hoc approach.

Some unique assumptions and implications in the TU(W) model utilized to advised individuals can be summarized as follows:

Individuals' preferences of leisure time and sustainable consumption are quantified and illustrated.

Individuals with finite lives value time differently than entities that are infinite in nature.

Individuals' unique preferences are used to determine a critical wealth levels that determine a shift in risk aversion.

Critical wealth levels and retirement goals provide reference points for individuals to determine optimal asset allocation and rebalancing strategies.

In addition to critical wealth, the VIX index is used as a "fear indicator" for individuals who are loss averse to enter and exit the market.

An empirical investigation illustrates the advantages of focusing on critical wealth levels and the VIX index as opposed to the traditional ad hoc financial planning approach.

The VIX Index

The VIX index was first introduced by the Chicago Board Options Exchange (CBOE) in 1993 as a measurement of implied volatility based on S&P 500 (SPX) call and put options. A new VIX index was created in September 2003 by the CBOE that uses 30-calendar-day out-of-the-money SPX calls and puts with weights that are inversely proportional to the squared strike price. This version of the VIX is calculated retrospectively back to January 1990. The VIX index is used herein as an implied volatility measurement effective in predicting future market volatility.

Defining the Time Utility of Wealth Model

The wealth maximization assumption is problematic for individuals with finite lives. The maximization of wealth implicitly assumes that individuals will never retire from work voluntarily and continue to make economic choices that will always maximize financial wealth. Contrary to previous methods of advising individuals, the method disclosed herein assumes individuals do not solely desire to maximize wealth. Obviously the maximization of wealth is not the most common observed pattern of behavior for individuals. Most individuals value leisure time as well as consumption. A common practice of financial advisors is to reduce equities as individuals approach a retirement age to reflect the desire to optimize leisure time, i.e., duration or retirement, and sustainable consumption. Individuals tend to behave in a manner consistent with their anticipated life expectancy and desired standard of living. Retirement is a rationale option for individuals as it illustrates his or her value of leisure time in addition to consumption or wealth.

In fact the purpose of building up retirement wealth is to sustain a desired standard of living during retirement. Throughout life individuals are forced to make decisions based on their perceived value of leisure time and standard of living or consumption. The annual salary of each individual reflects the amount of labor hours an individual is willing to provide in exchange for wealth. Therefore, time in the form of labor hours can be viewed as a valuable commodity for which individuals are willing to exchange for wealth.

In the method an individual's portfolio asset allocation between risky securities and the risk-free security is determined based on the relationship of a critical wealth (CW) to terminal wealth (TW), i.e., a goal for retirement wealth, and the implied volatility of the market represented by the VIX index. A critical wealth level is determined based on the combined notions of safety first, loss aversion, expected utility, and diminishing human capital. The critical wealth level is a function of an individual's desire to maintain a desired standard of living or sustainable consumption level for the remainder of his or her life. Individuals are cognizant of the fact that they have diminishing human capital that must be converted into financial wealth to sustain their consumption during retirement. Individuals reach a satiation level of consumption and no longer desire to strictly maximize wealth. Rather, individuals act in a manner that will protect their critical wealth level and seek a target terminal wealth level at the beginning of retirement that will sustain constant consumption in retirement.

Under traditional expected utility models, a measure of risk aversion is required as an exogenous variable. Empirical surveys provide some support for reasonable parameter estimates regarding risk aversion. However, in order to accurately measure the preferences of all individuals there would need to be a commodity that is valued similarly by all individuals. All individuals value time and have finite lives that are relatively equal. This common value of time that is measurable for all individuals provides a unique opportunity to model preferences with respect to time and wealth. In a sense, time is viewed as a commodity in this paper. An individual's value of time is directly observable by the salary an individual is willing to obtain for giving up leisure time in exchange for wealth. The utility tradeoff is between the satisfaction of leisure time and sustainable consumption. The remainder of this section develops a model based on measuring the tradeoff of an individual's value of time and sustainable consumption.

Optimizing Leisure Time and Consumption

Figure 3:
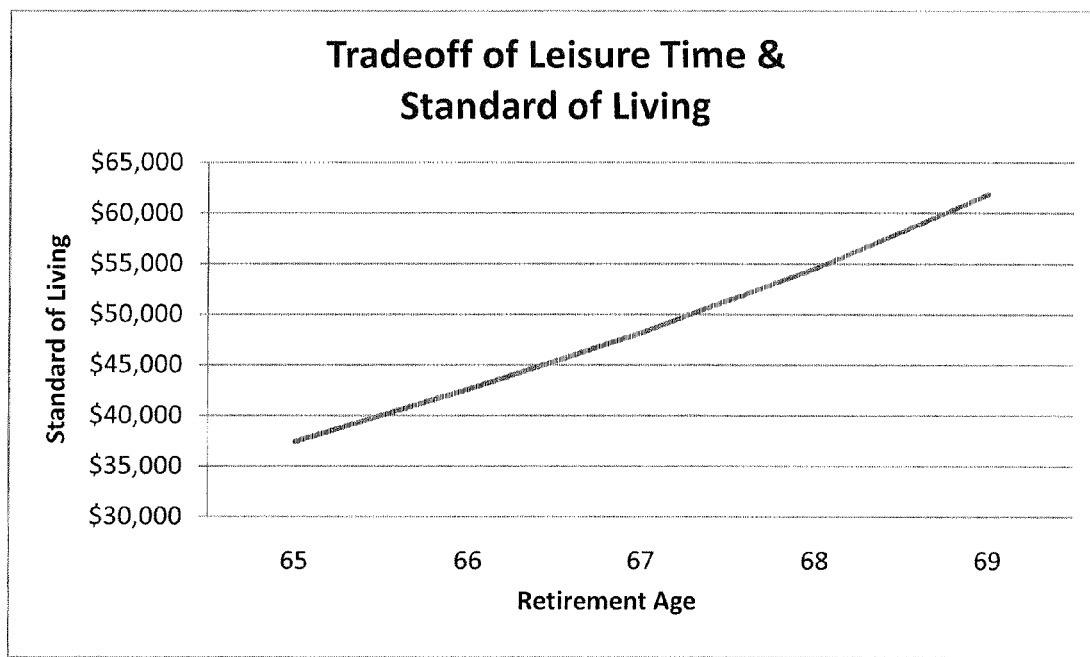
FIG. 3 is a graph depicting the trade-off between retirement age and standard of living during retirement.

In developing the method disclosed herein, all individuals have a limited amount of total time that is allocated towards labor and leisure time, i.e., retirement. Individuals are assumed to allocate more time to labor in order to increase wealth that is used for current and retirement consumption. Every individual is assumed to maximize an optimal tradeoff of leisure time and consumption. It is assumed that individuals do not desire to strictly maximize wealth or their standard of living. In other words, individuals are not inherently greedy. Rather, individuals set goals in life that reflect their desired sustainable standard of living throughout life. Thus, a student going to medical school, may borrow and increase her standard of living knowing that her labor time or human capital will be more valuable in the future. Alternatively, another individual may desire to spend more leisure time before and after retirement and does not wish to obtain additional education to increase the value of her human capital. Thus, the second individual is content with a lower standard of living prior to and after retirement. It is assumed that all individual seek a constant standard of living consistent with a constant sustainable consumption goal. FIG. 3 illustrates the tradeoff between retirement age and a desired standard of living. Delaying retirement will allow individuals to consume more in retirement and consuming less in retirement will allow individuals to retire earlier.

The tradeoff of leisure time and a constant sustainable consumption can be expressed in equation (1). Time Utility of Wealth, TU(W), is defined as the tradeoff between leisure time (l) and the individual's annual sustainable consumption, C.

$$TU(W) = l(C) \quad (1)$$

Individuals optimize the total amount of consumption, C, and leisure time, l, in retirement. All individuals desire to increase both leisure time and consumption, but they realize there is a tradeoff involved. Therefore, individuals desire to optimize both leisure time and consumption. An individual's utility or satisfaction is increased (decreased) with more (less) leisure time and/or more (less) consumption. Individuals value both increased standards of living measured by consumption and increased leisure time. However, increased standards of living require an increase to labor time in order to maximize terminal wealth that will sustain more consumption in retirement. Individuals are forced to make consumption and leisure choices that provide a balanced life based on personal preferences consistent with physical and mental abilities and limitations.

Defining Labor Time

Time has a mathematical function of wealth that is relatively equal for all individuals commonly referred to as the time value of money (TVM) formula. The TVM formula defines the tradeoff of time and wealth and is a very important tool in financial planning. The more common form of the future value, FV, of a savings annuity, S, plus the future value of a lump sum in equation (2), is rearranged to solve for the time remaining to terminal wealth (t) in equation (3).

$$TW = FV = S\left(\frac{(1+r)^t - 1}{r}\right) + W(1+r)^t \quad (2)$$

$$t = \frac{\ln(rTW + S) - \ln(rW + S)}{\ln(1+r)} \quad (3)$$

The time remaining to terminal wealth (t), is defined as the amount of working years required to obtain a terminal wealth level or retirement goal that will sustain a constant standard of living throughout an individual's retirement. Mathematically the time remaining to terminal wealth or remaining labor years (t) is equal to the natural log of the expected annual return (r) times terminal wealth or the retirement goal (TW) plus an annual savings annuity (S) less the natural log of the expected annual return (r) times current wealth (W) plus annual savings (S) divided by the natural log of one plus the expected annual rate of return (1+r).

Equation (3) demonstrates the interactions of time remaining to terminal wealth (t), terminal wealth (TW), savings (S), current wealth (W), and expected return (r). The more common form of the future value of an annuity plus a lump sum formula clearly demonstrates that future value, or terminal wealth, is increased by increasing time (t), savings (S), present wealth (W), or the expected return (r). All variables on the right side of equation (9) are exogenous, with the exception of terminal wealth, TW. Terminal wealth is the amount of wealth required to sustain consumption during retirement. For all examples in this paper a 4% payout rate during retirement is assumed to determine the appropriate terminal wealth goal based on the level of desired sustainable consumption as follows: TW=C/0.04.

Throughout life individuals make tradeoffs between the allocation of time and wealth, where time remaining to terminal wealth (t) is directly related to terminal wealth (TW). Individuals build wealth as they go through life and approach terminal wealth. The total remaining amount of time in years (T) is unknown with certainty but is defined as the individual's life expectancy less the current age. The fact that individuals do not know their lifespan is not problematic, because individuals make choices based on expected life spans. Life expectancy is an exogenous variable based on an individual's current health, family medical history, and actuarial tables.

The uncertainty regarding the total amount of time remaining to retirement, t, is reduced by individuals as they age. For example, a sixty-five year old individual may be quite certain that they will not be working past the age of seventy due to physical and/or mental limitations. Whereas, an individual in her twenties or thirties is much less certain about the probability of favorable or unfavorable events that will impact her ultimate sustainable standard of living and desired amount of time in retirement, l.

Casual empirical evidence implies the desire for leisure time increases and the desire for increasing a living standard decreases as an individual approaches retirement. For example, a young individual is primarily concerned with increasing wealth and a desired standard of living. As an individual approaches retirement, the individual's value of leisure time increases as his or her value of consumption decreases. As individuals age they realize that their human capital is depleting and are forced to determine a sustainable standard of living for retirement. Thus, individuals do not desire to strictly maximize wealth. Their desire is to sustain a standard of living and leisure time that is obtainable based on their depleting human capital and terminal wealth at the end of their working years. If this were not true then individuals would never voluntarily retire as they would continue to work in an attempt to increase wealth and consumption buying larger houses more goods and services to reflect increases in standards of living.

Defining Time Utility of Wealth, TU(W)

The TU(W) model defines the optimal critical wealth, CW, and terminal wealth, TW, targets for an individual approaching retirement. The relationship of critical wealth to terminal wealth along with the level of implied volatility, determine the optimal asset allocation for individuals after a critical wealth level is reached and prior to retirement. Individuals make choices regarding the use of their remaining time, T, based on inferences drawn from their current health, attitude, environment, and family history. Equation (4) defines leisure time, l, as the difference between total time quantified as life expectancy less current age, T, and working time, t.

$$l = (T-t) \quad (4)$$

Equation (5) is derived by substituting t from equation (3) into equation (4).

$$l = \left[ T - \frac{\ln(rTW + S) - \ln(rW + S)}{\ln(1 + r)} \right] \quad (5)$$

Equation (6) is derived by substituting l from equation 5 into equation 1.

$$TU(W) = C\left[ T - \frac{\ln(rTW + S) - \ln(rW + S)}{\ln(1 + r)} \right] \quad (6)$$

An individual's obtainable level of consumption and leisure time are a function of many factors that influence terminal wealth. The current level of wealth, W, represents the starting point for the individual's transitional period of their utility function and the terminal wealth represents the ending point of the individual's transitional period of the utility function. Subtracting wealth (W) from both sides of equation (6) results in:

$$TU(W) - W = C\left[ T - \frac{\ln(rTW + S) - \ln(rW + S)}{\ln(1 + r)} \right] - W \quad (7)$$

All variables on the right side of equation (7) are exogenous, with exception of TW that is defined as C/0.04. The endogenous variables for the TU(W) model are critical wealth, CW, critical time horizon, t*, and the percentage to invest in risky securities and the risk-free securities.

Defining Critical Wealth

The model assumes that all individuals reach a critical point in life where their value of leisure time is equal to their value of consumption. Increased allocation of time towards labor hours is consistent with maximizing a constant level of consumption by increasing terminal wealth, while increased allocation of time towards leisure hours is consistent with maximizing leisure time. The marginal utility of the individual determined by finding the first derivative of the individual's utility function defined in equation (7) as follows:

$$\frac{dTU(W) - W}{dW} = \left( \frac{C}{\ln(1+r)} \right)\left( \frac{r}{(rW+S)} \right) - 1 \quad (8)$$

A critical wealth level is determined by setting the first derivation with respect to wealth of the time utility of wealth function equal to zero as shown in equation (9). The critical wealth level that determines the reference point where an individual is indifferent regarding the tradeoff between leisure time and consumption or wealth is defined as:

$$CW^* = \frac{\frac{Cr}{\ln(1+r)} - S}{r} \quad (9)$$

The critical wealth level is directly related to the most important determinants of a terminal wealth level or retirement goal. It is interesting to note that the individual's critical wealth level is strictly a function of sustainable consumption, pre-retirement savings, and an expected rate of return. The critical wealth level is not directly dependent upon time or the terminal wealth level. Rather it is closely related to an individual's desired consumption in retirement, savings and an expected rate of return. However, the expected rate of return, r, is an exogenous variable. It is a function of individual's risk-aversion preference.

A range of expected returns are defined where the maximum expected return reflects the individual's asset allocation with a maximum exposure to risky securities based on their pre-defined level of risk aversion. Thus, the individual desires to maximize wealth prior to reaching a critical wealth level and their asset allocation is determined under mean-variance or any other model that assumes the maximization of wealth. The lower range or minimum expected return is consistent with the individual's desired asset allocation at the start of retirement.

In the savings period prior to reaching the critical wealth level, wealth is accumulated and compounds at a return consistent with the individuals maximum percentage in risky securities. During the retirement period allocations to risky securities are at the minimum level reflective of the individual's desire to reduce the volatility of returns after human capital is depleted. Sustainable consumption is an annuity that is a function of the total wealth at the beginning of the retirement period and the expected return during retirement reflects the individual's minimum percentage in risky securities.

At lower levels of wealth individuals value wealth more than leisure time and are therefore invested in more risky assets to maximize wealth. At the critical point an individual's preference of consumption is equivalent to the preference of leisure time. This critical point has a critical wealth and critical time horizon associated with it. To the left of the critical wealth point, or at levels of wealth less than the critical amount of wealth, the individual values changes in wealth more than changes in leisure time. Thus, the individual is more concerned with maximizing wealth than leisure time to the left of the critical point. To the right of critical wealth, the individual values changes in leisure time more than changes in wealth. Thus, the individual is more concerned with maximizing leisure time than terminal wealth to the right of the critical point. The amount of time from the critical wealth point to terminal wealth is a critical time horizon. Individuals with finite lives value leisure time more than wealth in later stages of life.

This critical point is an important reference point that can be used by individuals to rebalance their portfolios consistent with their desired constant standard of living and leisure time. In method disclosed herein, the critical wealth level defines a disaster level that reflects an individual's sustainable level of consumption. The individual protects this critical wealth to insure drastic reductions in their standards of living are not required in retirement.

Once individuals' financial wealth is equal to or greater than the critical wealth level, they are advised to begin to reduce the amount invested in equities. The percentage invested in risky securities is determined by the following formula:

$$RiskySecurities\ \% = Min\ \% + (Max\ \% - Min\ \%)\frac{(TW-W)^2}{(TW-CW)^2} \quad (10)$$

where Min %=desired percentage in equities during retirement

Figure 4:
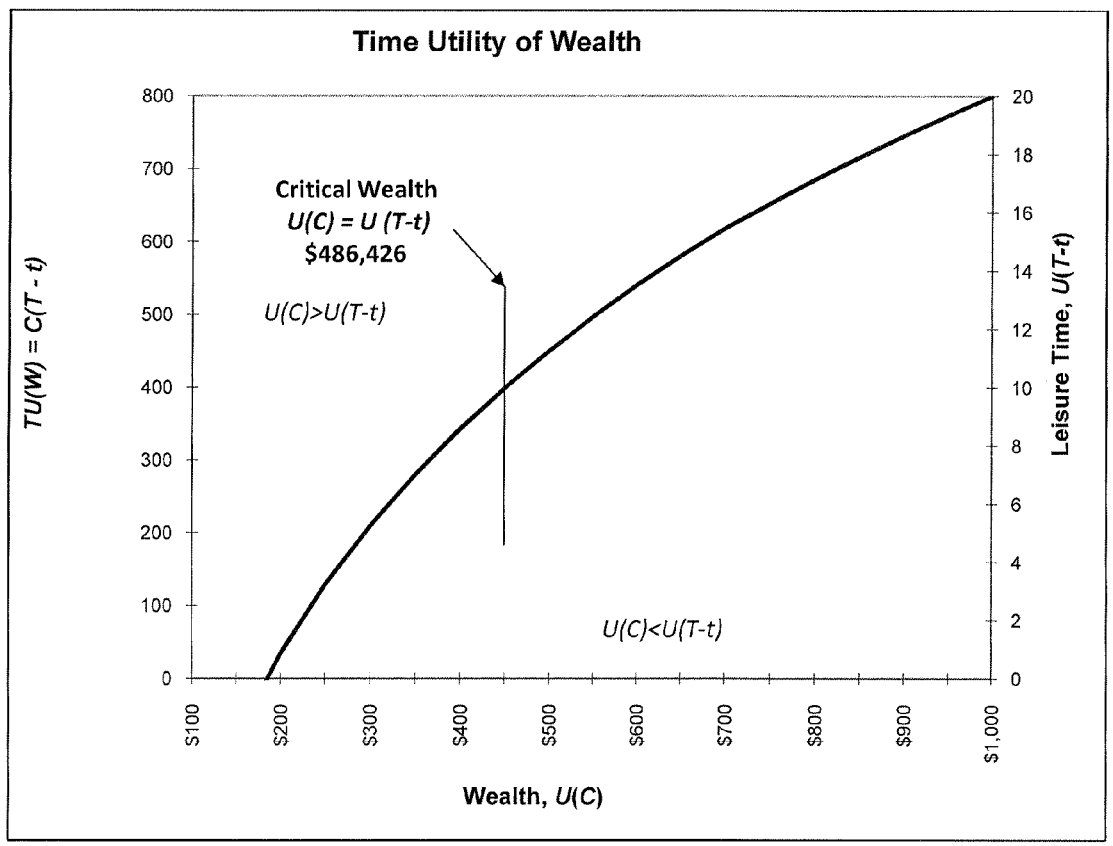
FIG. 4 is a graph illustrating the TU(W) for an individual as a function of annual consumption (C), total time (T), labor time (t), terminal wealth or retirement goal (FV), current wealth (W), expected return (r), and savings annuity (S).

Max %=percentage in equities prior to the critical wealth
TW=dollar amount of retirement goal
W=current dollar amount of wealth
CW=critical wealth dollar amount Practical Example of Implementing the Model The tradeoff of an individual's preference for leisure time vs. wealth or consumption is defined as Time Utility of Wealth function, TU(W), by equation (6) and illustrated in FIG. 4. FIG. 4 illustrates the desired growth in wealth over time of a 45 year old individual who desires to retire with $1,000,000 at the age of 65. The assumptions for this particular example defines TU(W) as a function of annual consumption (C)=$40,000, remaining life expectancy less current age (T)=40 years (85-45), time remaining to terminal wealth (t)=20 years (65-45), terminal wealth (FV)=$1,000,000, current wealth (W)=$108,000, expected annual return (r)=7.5%, and an annual savings annuity (S)=$5,000.

FIG. 4 represents the tradeoff between leisure time and wealth. Most individuals begin their working careers on the left-hand side of the graph with no wealth. In this example, the individual desires to spend 20 years in retirement and maintain a constant consumption of $40,000 a year. Maximizing wealth and consumption is more important to a young individual than leisure time. Young individuals plan on acquiring wealth to maximize terminal wealth by forgoing leisure for more labor hours. In this example, leisure time equals 20 years and is calculated by taking the individual's remaining life expectancy of 85 years less the expected retirement age of 65.

It is important to note that the left-hand side y-axis is consistent with equation (6) and assumes the optimal desired time in retirement is 20 years with a constant standard of living of $40,000. The optimal TU(W) for this individual in it's simplest form using equation (1) is calculated as follows: TU(W)=l(C)=20*(40,000)=800,000. Individuals desire to increase both time in retirement and the standard of living in retirement. However, increasing (decreasing) time in retirement requires a tradeoff of decreasing (increasing) the constant standard of living.

The right-hand side y-axis illustrates the time remaining to retirement or working years, t. The process of financial planning involves determining a retirement goal that will sustain an individual's desired standard of living for their remaining life. The x-axis of FIG. 4 demonstrates the present value of wealth with a retirement goal of $1,000,000, a constant annual return of 7.5%, an annual savings annuity of $5,000 and time remaining to retirement of t as defined on the right-hand side y-axis. For example, when an individual has $486,425 in current wealth the expected remaining time to retirement is 9.08 years, i.e., the duration of the critical wealth period. Where t is determined by the time value of money formula as follows:

$$t = \frac{\ln(.075*1,000,000+5,000) - \ln(.075*486,426+5,000)}{\ln(1.075)} = \frac{11.28978 - 10.63301}{.072321} = 9.08\ \text{years}.$$

As individuals go through life, their value of leisure time, i.e., retirement, increases with age and increasing financial wealth. A desired standard of living is established that represents a sustainable level of consumption over their life span. At retirement there is no remaining time to terminal wealth, t=0, and the individual's expected utility is equal to his or her sustainable annual consumption, C, and remaining life expectancy or leisure time, l. The expected utility is bounded by the terminal or retirement wealth amount that is required to sustain consumption throughout the individual's remaining life.

Applying the TU(W) Model to the Retirement Decision

Figure 5:
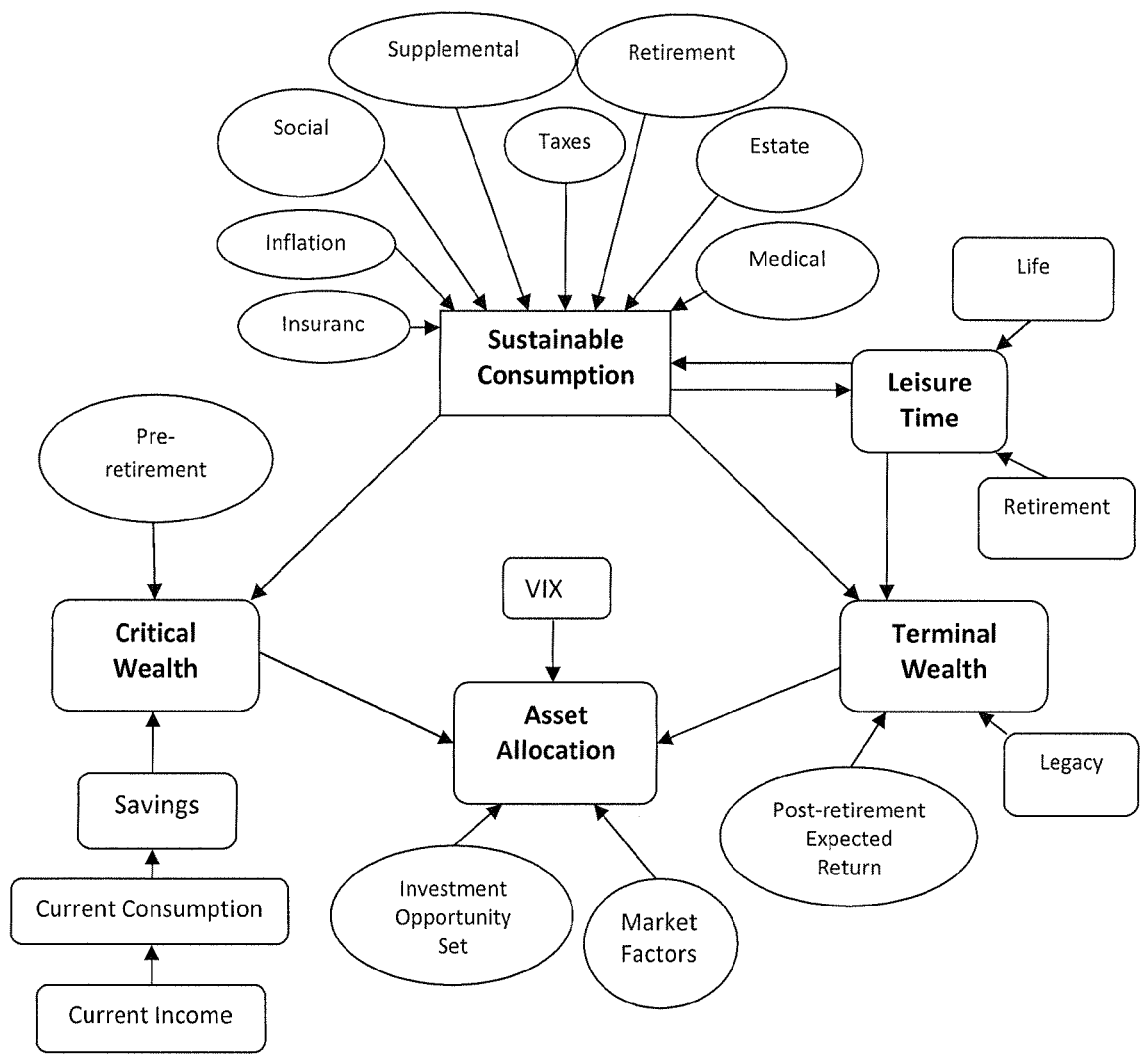
FIG. 5 is a diagram showing relevant parameters that may be considered when applying the TU(W) model to the asset allocation decision.

FIG. 5 illustrates the dynamic process involved in the retirement decision making model. At the very heart of the decision is the tradeoff of leisure time and sustainable consumption. Rather than assume individuals desire to maximize wealth, a target terminal wealth or retirement goal is set that reflects an individual's preference of sustainable consumption and leisure time.

As individuals approach retirement age they are no longer strictly maximizing wealth. Rather, they are targeting an optimal amount of consumption and leisure time. In full retirement, individuals are no longer able to make major adjustments to the amount of time spent in either labor or leisure because human capital is diminishing due to physical and mental limitations. Thus, the percentage invested in equities is reduced to decrease uncertainty of future returns by reducing the volatility of portfolio returns. FIG. 5 illustrates the dynamic process of applying the TU(W) model in retirement planning. There are numerous factors that impact an individual's sustainable consumption such as taxes, social security, inflation, insurance, life style, medical expenses and others. FIG. 5 illustrates many parameters that are influenced by these factors. Thus, a framework is provided for addressing numerous retirement issues.

The first reference point, terminal wealth, reflects the desired tradeoff of leisure time and consumption. The critical wealth level provides a second reference that reflects an individual's desired sustainable consumption. The asset allocation mix is determined based on these two reference points and the level of the VIX index. The models used herein assume that individuals cognizant of protecting a critical wealth level are not willing to participate in markets that are extremely volatile. While, they may not always maximize wealth with this strategy, they are in a better position to protect a critical wealth level similar to the notion of safety first.

Investor preferences regarding the tradeoff of leisure time and consumption determine the driving factors of the model. Equation (1) presents an individual's expected utility function in its simplest form as a tradeoff of leisure time and consumption, $TU(W)=l(C)$. Equation (8) identifies the critical wealth level that optimizes and individual's expected utility of leisure time and consumption. This critical wealth level identifies the critical point where individuals should begin to reduce the amount in equities from their maximum allowable amount invested in equities to their desired target percentage in equities during retirement. The gradual shift in reducing equities is consistent with the gradual shift in an individual's preferences of strictly maximizing wealth to maximizing leisure time and retirement consumption.

The process involves three time lines, the savings time line, i.e., wealth maximizing phase, the time between critical wealth and terminal wealth, i.e., critical wealth phase, and the retirement time line. The retirement goal is the ending terminal value of the savings time line and the beginning present value of the retirement time line. Thus, the retirement goal must be sufficient to meet consumption during retirement. Current income is designated towards current consumption and savings for future consumption. A target retirement goal is determined based on the amount of consumption in retirement and the amount of time spent in retirement. The amount of time spent in retirement in defined as leisure time and is a function of life expectancy and the retirement age. The critical wealth level and the retirement goal are used in conjunction to determine an appropriate asset allocation mix consistent with the individual's preferences regarding wealth and time.

The market volatility index (VIX) provided by the Chicago Board Options Exchange (CBOE) is used as an implied volatility measure that triggers a switch in asset allocation. This paper examines the performance of the conventional financial planning model that bases asset allocation on age of the individual versus the TU(W) approach that adjusts investments based on the level of critical wealth in relationship to a retirement goal and the level of the VIX index. When the VIX index is equal to or greater than 30 the portfolio allocation switches to 100% in the risk-free security. When the VIX index decreases below 30 for 20 consecutive trading days, as investors gain more confidence in the market the portfolio switches to the allocation in securities determined by equation (9).

Historical Comparison of TU(W) Model and Traditional Approach

An empirical investigation using the Standard and Poor's 500 index as a proxy for the risky security portion of individual portfolios is examined from 1990 to 2008. The TU(W) approach incorporates critical wealth levels and the VIX index to adjust asset allocations during the retirement planning time line.

For all cases individuals are assumed to have a life expectancy of 85 years and are planning to retire at age of 65. Individuals are assumed to have a maximum percentage in equities of 80% prior to retirement and a minimum percentage in equities of 50% during retirement. The individuals' standard of living and needs during retirement are assumed to require a sustainable consumption of $40,000 per year.

The expected return is 7.5% before taxes prior to retirement with a risk tolerance that reflects an 80% investment in equities with an expected return of 8.375% and a 20% investment in bonds with an expected return of 4%. The retirement goal is determined based on the annuity payment of $40,000 a year and an assumed sustainable payout ratio of 4%, as follows $40,000/0.04. The retirement goal of $1,000,000 is assumed to be sufficient to sustain a 4% annual distribution. The critical wealth is $486,426 and is calculated as follows:

$$CW^* = \frac{\frac{Cr}{\ln(1+r)} - S}{r} = \frac{\frac{\$40,000(.075)}{\ln(1.075)} - \$5,000}{.075} = \$486,426.$$

The critical wealth point of $486,426 determines the point where an individual is indifferent regarding the tradeoff between leisure time and sustainable consumption. In this example, investing 80% in equities with an expected return of 8.375% and investing 20% in the risk-free security with an expected return of 4% results in an expected portfolio return of 7.5%. The critical time horizon is 9.08 years determined by the amount of working years, t, that critical wealth and savings need to compound at 7.5% to reach the terminal, or retirement, wealth goal of $1,000,000. This is calculated using equation (3) as follows:

$$t = \frac{\ln(.075*1,000,000 + 5,000) - \ln(.075*486,426 + 5,000)}{\ln(1.075)} = \frac{11.28978 - 10.63301}{.072321} = 9.08 \text{ years}.$$

Table 1 demonstrates how the TU(W) model would have compared historically to the more traditional financial planning process for one case where the individual is 49 years old in 1990. The S&P 500 index is used as a proxy for the risky portfolio and a 4% risk-free rate of return is assumed from 1990 to 2008. The TU(W) approach is compared to the traditional approach of defining the percentage to invest in equities as 115 minus the age of the individual. Thus, the traditional approach would suggest equities at 66% (115−49) for 1990 and equities would be reduced by 1 percent each following year.

TABLE 1

| Year | Age | Traditional | % Equity | Critical Wealth | % Equity | BH Equity ret | VIX Equity ret | Risk-free Return |
|------|-----|-------------|----------|-----------------|----------|---------------|----------------|------------------|
| 1990 | 49  | $268,679    | 66%      | $268,679        | 80%      | 0.0451        | 0.0267         | 4%               |
| 1991 | 50  | $310,770    | 65%      | $285,557        | 80%      | 0.1886        | 0.0453         | 4%               |
| 1992 | 51  | $334,945    | 64%      | $309,607        | 80%      | 0.0734        | 0.0734         | 4%               |
| 1993 | 52  | $365,693    | 63%      | $341,261        | 80%      | 0.0976        | 0.0976         | 4%               |
| 1994 | 53  | $370,752    | 62%      | $342,648        | 80%      | −0.0232       | −0.0232        | 4%               |

TABLE 1-continued

| Year | Age | Traditional | % Equity | Critical Wealth | % Equity | BH Equity ret | VIX Equity ret | Risk-free Return |
|---|---|---|---|---|---|---|---|---|
| 1995 | 54 | $462,307 | 61% | $446,886 | 80% | 0.3520 | 0.3520 | 4% |
| 1996 | 55 | $541,090 | 60% | $539,855 | 74% | 0.2361 | 0.2361 | 4% |
| 1997 | 56 | $634,911 | 59% | $618,632 | 67% | 0.2469 | 0.1705 | 4% |
| 1998 | 57 | $764,719 | 58% | $714,199 | 59% | 0.3054 | 0.1999 | 4% |
| 1999 | 58 | $822,364 | 57% | $765,685 | 56% | 0.0897 | 0.0823 | 4% |
| 2000 | 59 | $831,945 | 56% | $794,409 | 55% | −0.0204 | 0.0240 | 4% |
| 2001 | 60 | $771,163 | 55% | $739,016 | 58% | −0.1726 | −0.1717 | 4% |
| 2002 | 61 | $687,030 | 54% | $703,200 | 60% | −0.2429 | −0.1249 | 4% |
| 2003 | 62 | $824,086 | 53% | $830,906 | 53% | 0.3219 | 0.2641 | 4% |
| 2004 | 63 | $863,940 | 52% | $871,057 | 52% | 0.0443 | 0.0443 | 4% |
| 2005 | 64 | $923,106 | 51% | $930,627 | 51% | 0.0836 | 0.0836 | 4% |
| 2006 | 65 | $1,004,366 | 50% | $1,012,157 | 50% | 0.1236 | 0.1236 | 4% |
| 2007 | 66 | $1,008,612 | 49% | $1,016,397 | 50% | −0.0415 | −0.0415 | 4% |
| 2008 | 67 | $836,051 | 48% | $949,812 | 50% | −0.4009 | −0.1809 | 4% |

The TU(W) approach assumes the individual has a maximum risk tolerance that implies an 80 percent allocation to equities prior to reaching a critical wealth level. The minimum risk tolerance implies a 50 percent allocation to equities at the start of retirement. Once the individual's financial wealth is equal to or greater than the critical wealth level of $486,426, the amount invested in equities is reduced. The gradual reduction in equities is illustrated in Table 1 where the percentage in equities is calculated using equation (16), when the VIX is less than 30. At the end of 1996 the TU(W) approach has $539,855. The level of wealth is greater than the critical wealth level of 486,426. Therefore the individual begins to reduce the percentage invested in equities to 74%, calculated as follows:

$$\text{Min \%} + (\text{Max \%} - \text{Min \%}) \frac{(TW - W)^2}{(TW - CW)^2} =$$

$$0.50 + (0.80 - 0.50) \frac{(\$1,000,000 - \$539,855)^2}{(\$1,000,000 - \$486,426)^2} = 0.74$$

Table 2 summarizes the results comparing the two approaches for the period 1990 to 2008. Each panel in Table 2 summarizes the results for a particular starting year. For example in the beginning period is 1990 for Panel A, 1991 for Panel B, and so on. Each row summarizes the ending wealth at age 65 for each approach and the earliest age at which the wealth meets or exceeds the retirement goal. For example, row 1 of Table 2 Panel A summarizes the results for an individual who is 47 years old in 1990. Following the traditional approach of setting the percentage of equities at 115 less the age, the individual would not reach the retirement goal of $1,000,000 by the age of 65. The wealth at age 65 for the traditional approach is $716,354 and wealth at age 65 is $820,778 under the TU(W) approach.

TABLE 2

| | Traditional Method | | TU(W) Approach | | |
|---|---|---|---|---|---|
| Age | Early Age | Wealth at 65 | Early Age | Wealth at 65 | z-test |
| Panel A: 1990 | | | | | |
| 47 | N/A | $716,354 | N/A | $820,778 | 3.65 *** |
| 48 | N/A | $938,484 | N/A | $948,532 | 0.35 |
| 49 | 65 | $1,004,366 | 65 | $1,012,157 | 0.27 |
| 50 | 66 | $992,146 | 66 | $997,878 | 0.20 |

TABLE 2-continued

| | Traditional Method | | TU(W) Approach | | |
|---|---|---|---|---|---|
| Age | Early Age | Wealth at 65 | Early Age | Wealth at 65 | z-test |
| 51 | 66 | $998,966 | 66 | $995,877 | −0.11 |
| 52 | 61 | $1,025,041 | 65 | $1,012,046 | −0.45 |
| 53 | 61 | $928,160 | 63 | $929,031 | 0.03 |
| 54 | 62 | $1,106,461 | 63 | $1,023,980 | −2.89 |
| 55 | 63 | $1,266,254 | 63 | $1,155,978 | −3.86 |
| 56 | 63 | $1,337,316 | 64 | $1,182,593 | −5.41 |
| 57 | 64 | $1,338,518 | 64 | $1,178,860 | −5.59 |
| 58 | 64 | $1,216,866 | 64 | $1,115,940 | −3.53 |
| Panel B: 1991 | | | | | |
| 48 | N/A | $681,702 | N/A | $841,168 | 5.58 *** |
| 49 | N/A | $893,133 | N/A | $969,647 | 2.68 ** |
| 50 | N/A | $956,065 | 65 | $1,034,970 | 2.76 ** |
| 51 | 66 | $944,772 | 65 | $1,018,791 | 2.59 ** |
| 52 | 66 | $951,689 | 65 | $1,016,833 | 2.28 * |
| 53 | 66 | $977,046 | 65 | $1,033,437 | 1.97 * |
| 54 | 62 | $885,240 | 62 | $948,979 | 2.23 * |
| 55 | 62 | $1,055,988 | 62 | $1,044,942 | −0.39 |
| 56 | 63 | $1,209,409 | 63 | $1,179,828 | −1.04 |
| 57 | 63 | $1,278,352 | 63 | $1,207,933 | −2.46 |
| 58 | 64 | $1,280,649 | 64 | $1,205,466 | −2.63 |
| Panel C: 1992 | | | | | |
| 49 | N/A | $688,549 | N/A | $846,773 | 5.54 *** |
| 50 | N/A | $902,529 | N/A | $975,462 | 2.55 ** |
| 51 | N/A | $966,559 | 65 | $1,041,260 | 2.61 ** |
| 52 | 66 | $955,564 | 65 | $1,024,498 | 2.41 ** |
| 53 | 66 | $962,985 | 65 | $1,022,571 | 2.09 * |
| 54 | 66 | $989,074 | 65 | $1,039,286 | 1.76 * |
| 55 | 62 | $896,526 | 62 | $954,031 | 2.01 * |
| 56 | 62 | $1,069,916 | 62 | $1,050,554 | −0.68 |
| 57 | 63 | $1,225,876 | 63 | $1,186,520 | −1.38 |
| 58 | 63 | $1,296,289 | 63 | $1,216,473 | −2.79 |
| Panel D: 1993 | | | | | |
| 50 | N/A | $686,883 | N/A | $839,206 | 5.33 *** |
| 51 | N/A | $900,729 | N/A | $967,627 | 2.34 ** |
| 52 | N/A | $965,061 | 65 | $1,032,798 | 2.37 ** |
| 53 | 66 | $954,525 | 65 | $1,016,829 | 2.18 * |
| 54 | 66 | $962,396 | 65 | $1,014,869 | 1.84 * |
| 55 | 66 | $988,953 | 65 | $1,031,444 | 1.49 |
| 56 | 62 | $896,864 | 62 | $947,264 | 1.76 * |
| 57 | 62 | $1,070,866 | 62 | $1,042,996 | −0.98 |
| 58 | 63 | $1,227,601 | 63 | $1,179,790 | −1.67 |
| Panel E: 1994 | | | | | |
| 51 | N/A | $732,785 | N/A | $900,531 | 5.87 *** |
| 52 | N/A | $961,389 | 64 | $1,033,911 | 2.54 ** |
| 53 | 65 | $1,030,363 | 64 | $1,102,896 | 2.54 ** |
| 54 | 65 | $1,019,323 | 64 | $1,081,420 | 2.17 * |
| 55 | 65 | $1,027,874 | 64 | $1,079,526 | 1.81 * |
| 56 | 61 | $1,056,322 | 61 | $1,097,062 | 1.43 |

TABLE 2-continued

| | Traditional Method | | TU(W) Approach | | |
|---|---|---|---|---|---|
| Age | Early Age | Wealth at 65 | Early Age | Wealth at 65 | z-test |
| 57 | 61 | $957,974 | 61 | $1,002,312 | 1.55 |
| 58 | 62 | $1,143,826 | 62 | $1,103,765 | −1.40 |
| | | Panel F: 1995 | | | |
| 52 | N/A | $645,281 | N/A | $765,084 | 4.19 *** |
| 53 | N/A | $846,852 | N/A | $889,195 | 1.48 |
| 54 | N/A | $908,258 | N/A | $952,020 | 1.53 |
| 55 | N/A | $899,360 | 66 | $937,580 | 1.34 |
| 56 | 67 | $907,878 | 66 | $940,866 | 1.15 |
| 57 | 67 | $934,140 | 66 | $956,264 | 0.77 |
| 58 | 63 | $848,323 | 66 | $875,783 | 0.96 |
| | | Panel G: 1996 | | | |
| 53 | N/A | $601,199 | N/A | $684,576 | 2.92 ** |
| 54 | N/A | $789,311 | N/A | $807,889 | 0.65 |
| 55 | N/A | $847,087 | N/A | $868,448 | 0.75 |
| 56 | N/A | $839,432 | N/A | $856,854 | 0.61 |
| 57 | N/A | $848,107 | 68 | $859,336 | 0.39 |
| 58 | 68 | $873,464 | 68 | $879,051 | 0.20 |
| | | Panel H: 1997 | | | |
| 54 | N/A | $557,882 | N/A | $635,226 | 2.71 ** |
| 55 | N/A | $732,731 | N/A | $760,249 | 0.96 |
| 56 | N/A | $786,891 | N/A | $822,078 | 1.23 |
| 57 | N/A | $780,410 | N/A | $809,870 | 1.03 |
| 58 | N/A | $789,184 | N/A | $815,475 | 0.92 |
| | | Panel I: 1998 | | | |
| 55 | N/A | $504,544 | N/A | $577,699 | 2.56 ** |
| 56 | N/A | $662,885 | N/A | $695,846 | 1.15 |
| 57 | N/A | $712,383 | N/A | $759,649 | 1.65 * |
| 58 | N/A | $707,147 | N/A | $750,770 | 1.53 |
| | | Panel J: 1999 | | | |
| 56 | N/A | $506,749 | N/A | $578,408 | 2.51 ** |
| 57 | N/A | $666,118 | N/A | $696,809 | 1.07 |
| 58 | N/A | $716,215 | N/A | $761,945 | 1.60 |
| | | Panel K: 2000 | | | |
| 57 | N/A | $539,376 | N/A | $609,351 | 2.45 ** |
| 58 | N/A | $709,302 | N/A | $733,097 | 0.83 |

The difference in wealth is significant at the 0.001 level. Individuals who were the ages 54 through 58 at the beginning of 1990, would have had significantly more wealth at the 0.01 and 0.001 levels using the traditional approach. These results are not surprising given the long bull run in the 1990s. However, these results do not assume any changes in the retirement goal. If individuals experience larger than expected returns such as those experienced in the 1990s they may be inclined to increase their standard of living and retirement goal. This would have resulted in higher allocations to equities and would have reduced the difference in ending wealth at age 65.

All cases assumed no adjustments were made to savings, retirement date or any other parameter. At any time prior to retirement individuals will most likely make adjustments to reflect their preferred level of sustainable consumption and leisure time. If individuals find themselves with less wealth than expected prior to retirement they may either increase savings, retire at a later date, reduce the standard of living in retirement, or some combination of these three actions. Adjustments to savings or expected returns will influence sustainable consumption and the critical wealth level.

Panels B, C, and D of Table 2 illustrate that individuals with ages 48 through 54 are more likely to retire earlier or with more wealth at age 65 using the TU(W) approach. Individuals aged 58 at the beginning of 1991, 1992, and 1993 would have more wealth at age 65 using the traditional approach significant at the 0.01 or 0.05 levels. Panels E, F, G, H, I, J, and K of Table 2 illustrate that there were no cases where the traditional approach resulted in earlier retirement or more wealth at age 65. However, there were a number of cases where individuals were significantly better off using the TU(W) approach.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

I claim:

1. A computer-implemented method of generating a financial plan for an individual, comprising:
performing, via a processor, the steps of:
computing a utility function for an individual by calculating:

$$TU(W) = C\left[T - \frac{\ln(rTW + S) - \ln(rW + S)}{\ln(1 + r)}\right],$$

where TU(W) is time utility as a function of wealth, C is a target annual consumption during retirement for the individual, T is a life expectancy of the individual less the current age of the individual, r is an estimated total annual return on investments, TW is a retirement wealth for the individual, S is annual savings of the individual, and W is a current wealth of the individual, wherein the retirement wealth is a target wealth for the individual at the beginning of retirement;
calculating a critical wealth of the individual, the critical wealth comprising a wealth of the individual at an inflection point of the utility function for the individual;
determining whether said individual is in a wealth maximizing phase or a critical wealth phase, said determining step comprising,
categorizing said individual in a wealth maximizing phase if said individual has a current wealth equal to or greater than said critical wealth, and
categorizing said individual in a critical wealth phase if said individual has a current wealth less than said critical wealth;
computing a target asset allocation for a current wealth of said individual based on the determining, the target asset allocation during the critical wealth phase computed using a target asset allocation function comprising a target securities allocation of the current wealth based on at least the critical wealth and the retirement wealth; and
outputting said target asset allocation for said individual and at least one of said critical wealth, said retirement wealth, and a plot of at least a portion of said utility function.

2. The method according to claim 1, further comprising:
electronically monitoring an index of volatility of a stock index; and
advising said individual of a modified target securities allocation when said index crosses a pre-determined level, wherein said modified target securities allocation is
0% if said index exceeds said pre-determined level, and
said target securities allocation if said index is equal to or less than said pre-determined level for at least a pre-determined period of time.

3. The method according to claim 1, wherein the target asset allocation during the wealth maximizing phase is computed by assigning a wealth maximizing asset allocation as said target asset allocation if said individual is in a wealth maximizing phase, and
  wherein the target asset allocation function during the critical wealth phase comprises assigning to said target asset allocation a securities % as a target percentage of said current wealth invested in securities, if said individual is in a critical wealth phase, the securities % calculated using:

$$\text{Securities \%} = \text{Min \%} + (\text{Max \%} - \text{Min \%})\frac{(TW-W)^2}{(TW-CW)^2}$$

where Min % is a target percentage of assets in equities during retirement and Max % is the target percentage of assets in equities during wealth maximizing phase.

4. The method according to claim 1, wherein computing said critical wealth (CW*) comprises computing $$CW^* = \frac{\frac{Cr}{\ln(1+r)} - S}{r}.$$

5. The method according to claim 1, further comprising computing the retirement wealth (TW) using $$TW = C/r_{low}$$

where $r_{low}$ is an estimated total annual return on low risk investments.

6. The method according to claim 1, further comprising:
  investing said current wealth according to said target asset allocation.

7. The method according to claim 1, further comprising:
  computing a duration of said critical wealth phase (t*), said critical wealth phase spanning a period starting when said current wealth equals or exceeds said critical wealth and ending when said current wealth equals or exceeds said retirement wealth,
  said outputting step further comprising displaying said duration,
  wherein computing said duration comprises computing:

$$t^* = \frac{\ln(rTW+S) - \ln(rW+S)}{\ln(1+r)}.$$

8. The method according to claim 1, further comprising:
  electronically monitoring an index of volatility of a stock index; and
  advising said individual of a modified target securities allocation when said index crosses a pre-determined level, wherein said modified target securities allocation is
    0% if said index exceeds said pre-determined level, and
    said target securities allocation if said index is equal to or less than said pre-determined level for at least a pre-determined period of time.

9. The method according to claim 1, wherein the target asset allocation during the wealth maximizing phase is computed by assigning a wealth maximizing asset allocation as said target asset allocation if said individual is in a wealth maximizing phase, and
  wherein the target asset allocation function during the critical wealth phase comprises assigning to said target asset allocation a securities % as a target percentage of said current wealth invested in securities, if said individual is in a critical wealth phase, the securities % calculated using:

$$\text{Securities \%} = \text{Min \%} + (\text{Max \%} - \text{Min \%})\frac{(TW-W)^2}{(TW-CW)^2}$$

where Min % is a target percentage of assets in equities during retirement and Max % is the target percentage of assets in equities during wealth maximizing phase.

10. The method according to claim 1, wherein computing said critical wealth (CW*) comprises computing:

$$CW^* = \frac{\frac{Cr}{\ln(1+r)} - S}{r}.$$

11. The method according to claim 1, further comprising computing the retirement wealth (TW) using $$TW = C/r_{low}$$

where $r_{low}$ is an estimated total annual return on low risk investments.

12. The method according to claim 1, further comprising:
  investing said current wealth according to said target asset allocation.

13. The method according to claim 1, further comprising:
  computing a duration of said critical wealth phase (t*), said critical wealth phase spanning a period starting when said current wealth equals or exceeds said critical wealth and ending when said current wealth equals or exceeds said retirement wealth,
  said outputting step further comprising displaying said duration,
  wherein computing said duration comprises computing:

$$t^* = \frac{\ln(rTW+S) - \ln(rW+S)}{\ln(1+r)}.$$

14. A system for generating a financial plan for an individual, comprising:
  at least one processor;
  a display device; and
  a computer-readable medium communicatively coupled to the processor and the display device, the computer-readable medium storing instructions for controlling the processor to perform steps comprising:
    computing a utility function of wealth of said individual, the utility function computed by calculating:

$$TU(W) = C\left[T - \frac{\ln(rTW+S) - \ln(rW+S)}{\ln(1+r)}\right],$$

where TU(W) is time utility as a function of wealth, C is a target annual consumption during retirement for the individual, T is a life expectancy of the individual less the current age of the individual, r is an estimated total annual return on investments, TW is a retirement wealth for the individual, S is annual savings of the individual, and W is a current wealth of the individual, and the critical wealth comprising a level of wealth at which the individual is indifferent to a tradeoff between leisure time and sustainable consumption of wealth, wherein the retirement wealth is a target wealth for the individual at the beginning of retirement;

calculating a critical wealth, the critical wealth comprising a wealth of the individual at an inflection point of the utility function for the individual;

determining whether said individual is in a wealth maximizing phase or a critical wealth phase, said determining comprising,
   categorizing said individual in a wealth maximizing phase if said individual has a current wealth equal to or greater than said critical wealth, and
   categorizing said individual in a critical wealth phase if said individual has a current wealth less than said critical wealth;

computing a target asset allocation for a current wealth of said individual based on the determining, the target asset allocation during the critical wealth phase computed using a target asset allocation function comprising a target securities allocation of the current wealth based on at least the critical wealth and the retirement wealth; and outputting to said display device said target asset allocation for said individual and at least one of said critical wealth, said retirement wealth, and a plot of at least a portion of said utility function.

15. The system according to claim 14, wherein said instructions for computing a target asset allocation comprises computing the target asset allocation during the wealth maximizing phase by assigning a wealth maximizing asset allocation as said target asset allocation if said individual is in a wealth maximizing phase, and wherein the target asset allocation function during the critical wealth phase comprises assigning to said target asset allocation a securities % as a target percentage of said current wealth invested in securities, of said individual is in a critical wealth phase, the securities % calculated using:

$$\text{Securities \%} = \text{Min \%} + (\text{Max \%} - \text{Min \%}) \frac{(TW - W)^2}{(TW - CW)^2}$$

where Min % is a target percentage of assets in equities during retirement and Max % is the target percentage of assets in equities during wealth maximizing phase.

16. The system according to claim 14, wherein said instructions for computing said critical wealth (CW*) comprises computing CW* by calculating $$CW^* = \frac{\frac{Cr}{\ln(1+r)} - S}{r}.$$

17. The system according to claim 14, wherein said instructions for computing said retirement wealth (TW) comprises computing TW by calculating:

$$TW = C/r_{low}$$

where $r_{low}$ is an estimated total annual return on low risk investments.

18. The system according to claim 14, said instructions further comprising:
   computing a duration of said critical wealth phase (t*), said critical wealth phase spanning a period starting when said current wealth equals or exceeds said critical wealth and ending when said current wealth equals or exceeds said retirement wealth,
   said display device for displaying said duration,
   wherein computing said duration comprises computing:

$$t^* = \frac{\ln(rTW + S) - \ln(rW + S)}{\ln(1+r)}.$$

19. A non-transitory computer-readable medium, having stored thereon a computer program for generating a financial plan for an individual, the computer program a plurality of code sections, the plurality of code sections comprising instructions for perform the steps of:
   performing, via a processor, the steps of:
      computing a utility function for the individual by calculating:

$$TU(W) = C\left[T - \frac{\ln(rTW + S) - \ln(rW + S)}{\ln(1+r)}\right],$$

where TU(W) is time utility as a function of wealth, C is a target annual consumption during retirement for the individual, T is a life expectancy of the individual less the current age of the individual, r is an estimated total annual return on investments, TW is a retirement wealth for the individual, S is annual savings of the individual, and W is a current wealth of the individual, wherein the retirement wealth is a target wealth for the individual at the beginning of retirement;

calculating a critical wealth of the individual, the critical wealth comprising a wealth of the individual at an inflection point of the utility function for the individual;

determining whether said individual is in a wealth maximizing phase or a critical wealth phase, said determining step comprising,
   categorizing said individual in a wealth maximizing phase if said individual has a current wealth equal to or greater than said critical wealth, and
   categorizing said individual in a critical wealth phase if said individual has a current wealth less than said critical wealth;

computing a target asset allocation for a current wealth of said individual based on the determining, the target asset allocation during the critical wealth phase computed using a target asset allocation function comprising a target securities allocation of the current wealth based on at least the critical wealth and the retirement wealth; and outputting said target asset allocation for said individual and at least one of said critical wealth, said retirement wealth, and a plot of at least a portion of said utility function.

* * * * *